(12) United States Patent
Babazaki

(10) Patent No.: US 12,136,233 B2
(45) Date of Patent: Nov. 5, 2024

(54) CONTROL METHOD, LEARNING DEVICE, DISCRIMINATION DEVICE AND PROGRAM

(71) Applicant: NEC Corporation, Tokyo (JP)

(72) Inventor: Yasunori Babazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 438 days.

(21) Appl. No.: 17/434,096

(22) PCT Filed: Mar. 1, 2019

(86) PCT No.: PCT/JP2019/008018
§ 371 (c)(1),
(2) Date: Aug. 26, 2021

(87) PCT Pub. No.: WO2020/178881
PCT Pub. Date: Sep. 10, 2020

(65) Prior Publication Data
US 2022/0138984 A1    May 5, 2022

(51) Int. Cl.
*G06T 7/73* (2017.01)
*G06N 20/00* (2019.01)
*G06T 7/66* (2017.01)

(52) U.S. Cl.
CPC .............. *G06T 7/73* (2017.01); *G06N 20/00* (2019.01); *G06T 7/66* (2017.01);
(Continued)

(58) Field of Classification Search
CPC ... G06T 7/73; G06T 7/66; G06T 2207/20081; G06T 2207/20084; G06T 2207/20164;
(Continued)

(56) References Cited

U.S. PATENT DOCUMENTS

2004/0213454 A1* 10/2004 Lai .................. G06V 40/168
382/118
2009/0220157 A1    9/2009 Kato et al.
(Continued)

FOREIGN PATENT DOCUMENTS

| JP | 2009-211177 A | 9/2009 |
| JP | 2014-228893 A | 12/2014 |
| JP | 2016-197371 A | 11/2016 |

OTHER PUBLICATIONS

Wu, Yue, et al. "Facial landmark detection with tweaked convolutional neural networks." IEEE transactions on pattern analysis and machine intelligence 40.12 (2017): 3067-3074. (Year: 2017).*
(Continued)

*Primary Examiner* — Emily C Terrell
*Assistant Examiner* — Stefano Anthony Dardano

(57) ABSTRACT

The learning device includes a first trainer, a candidate area determinator and a second trainer. On the basis of a training image and a training label including the correct coordinate value relating to the feature point included in the training image, the first trainer generates a first discriminator learned to output the predicted coordinate value relating to a feature point from an input image. The candidate area determinator determines a candidate area of the feature point in the training image based on the predicted coordinate value outputted by inputting the training image to the first discriminator. The second trainer generates the second discriminator, which is learned to output the reliability map indicating the reliability to the feature point at each block in an input image, on the basis of a cut-out image that is the candidate area cut out from the training image.

7 Claims, 13 Drawing Sheets

(52) U.S. Cl.
CPC ............... *G06T 2207/20081* (2013.01); *G06T 2207/20084* (2013.01); *G06T 2207/20164* (2013.01)

(58) Field of Classification Search
CPC .......... G06T 7/74; G06N 20/00; G06V 10/25; G06V 10/774; G06V 10/806; G06V 40/168
See application file for complete search history.

(56) References Cited

U.S. PATENT DOCUMENTS

2014/0355821 A1* 12/2014 Solem ................ G06V 10/7557
382/103
2020/0410256 A1* 12/2020 Bayer .................. G06V 10/454

OTHER PUBLICATIONS

Li, Christy Yuan, Tadas Baltrušaitis, and Louis-Philippe Morency. "Constrained ensemble initialization for facial landmark tracking in video." 2017 12th IEEE International Conference on Automatic Face & Gesture Recognition (FG 2017). IEEE, 2017. (Year: 2017).*
International Search Report for PCT Application No. PCT/JP2019/008018, mailed on May 21, 2019.

* cited by examiner

FIG. 6A
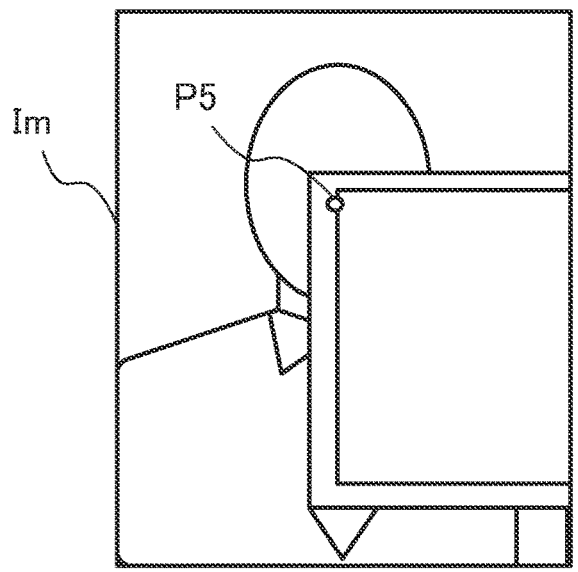
FIG. 6B
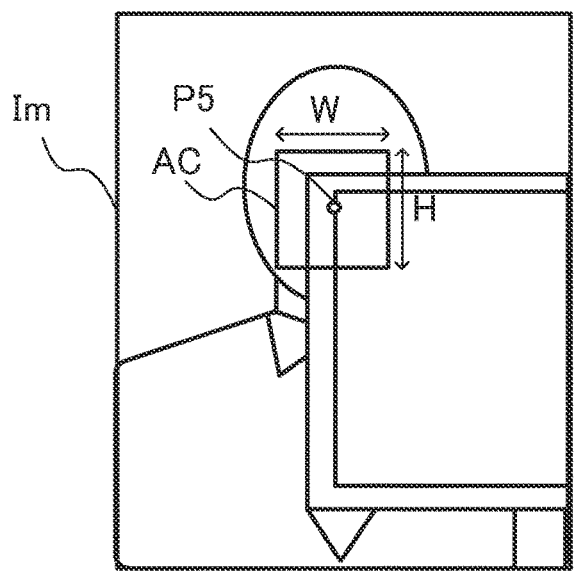
FIG. 6C
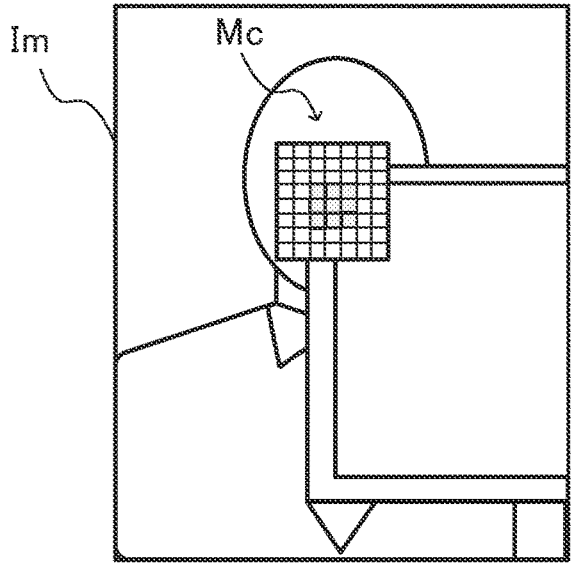

CONTROL METHOD, LEARNING DEVICE, DISCRIMINATION DEVICE AND PROGRAM

This application is a National Stage Entry of PCT/JP2019/008018 filed on Mar. 1, 2019, the contents of all of which are incorporated herein by reference, in their entirety.

TECHNICAL FIELD

The present invention relates to a technical field of a control method, a learning device, a discrimination device, and a program relating to machine learning and discrimination (identification) based on the machine learning.

BACKGROUND ART

An example of a method of extracting a predetermined feature point from an image is disclosed in Patent Literature 1. Patent Literature 1 discloses a method of extracting a feature point serving as a corner or an intersection for each local area in the input image by using a known feature point extractor such as a corner detector.

PRIOR ART DOCUMENTS

Patent Literature

Patent Literature 1: JP 2014-228893A

SUMMARY OF THE INVENTION

Problem to be Solved by the Invention

According to the method of Patent Literature 1, the type of extractable feature points is limited, and it is impossible to accurately acquire information relating to an arbitrary feature point specified in advance from a given image.

In view of the above-described issues, it is therefore an example object of the present disclosure to provide a control method, a learning device, a discrimination device, and a program capable of obtaining information relating to a feature point specified in advance with a high degree of accuracy from an image.

Means for Solving the Problem

In one mode of the control method, there is provided a control method executed by an information processing system, including: generating, on a basis of a training image and a training label which includes a correct coordinate value relating to a feature point included in the training image, a first discriminator learned to output a predicted coordinate value relating to the feature point from an input image; determining, on a basis of a predicted coordinate value outputted by the first discriminator to which the training image is inputted, a candidate area of the feature point in the training image; generating, on a basis of an image that is the candidate area cut out from the training image, a second discriminator learned to output a reliability map indicating reliability to the feature point at each block in an input image; acquiring a predicted coordinate value relating to the feature point by inputting a target image to the first discriminator; determining the candidate area of the feature point in the target image based on the predicted coordinate value; and outputting the reliability map corresponding to a cut-out image by inputting the cut-out image to the second discriminator, the cut-put image indicating the candidate area cut out from the target image.

In one mode of the learning device, there is provided a learning device including: a first trainer configured to generate, on a basis of a training image and a training label which includes a correct coordinate value relating to a feature point included in the training image, a first discriminator learned to output a predicted coordinate value relating to the feature point from the input image; a candidate area determinator configured to determine, on a basis of a predicted coordinate value outputted by the first discriminator to which the training image is inputted, a candidate area of the feature point in the training image; and a second trainer configured to generate, on a basis of an image that is the candidate area cut out from the training image, a second discriminator learned to output a reliability map indicating reliability to the feature point at each block in an input image.

In one mode of the discrimination device, there is provided a discrimination device including: a first discriminator processor configured to acquire a predicted coordinate value relating to a feature point by inputting a target image to a first discriminator, the first discriminator being learned, on a basis of a training image and a training label, to output a predicted coordinate value relating to the feature point from the input image, the training label including a correct coordinate value relating to the feature point included in the training image; a candidate area determinator configured to determine a candidate area of the feature point in the target image based on the predicted coordinate value; and a second discriminator processor configured to output a reliability map corresponding to a cut-out image by inputting the cut-out image to a second discriminator, the cut-out image indicating the candidate area cut out from the target image, the second discriminator being learned to output a reliability map indicating reliability to the feature point at each block in an input image.

In one mode of the control method, there is provided a control method executed by a learning device, including: generating, on a basis of a training image and a training label which includes a correct coordinate value relating to a feature point included in the training image, a first discriminator learned to output a predicted coordinate value relating to the feature point from an input image; determining, on a basis of a predicted coordinate value outputted by the first discriminator to which the training image is inputted, a candidate area of the feature point in the training image; and generating, on a basis of an image that is the candidate area cut out from the training image, a second discriminator learned to output a reliability map indicating reliability to the feature point at each block in an input image.

In one mode of the control method, there is provided a control method executed by a discrimination device, including: acquiring a predicted coordinate value relating to a feature point by inputting a target image to a first discriminator, the first discriminator being learned, on a basis of a training image and a training label, to output a predicted coordinate value relating to the feature point from the input image, the training label including a correct coordinate value relating to the feature point included in the training image; determining a candidate area of the feature point in the target image based on the predicted coordinate value; and outputting a reliability map corresponding to a cut-out image by inputting the cut-out image to a second discriminator, the cut-out image indicating the candidate area cut out from the target image, the second discriminator being learned to output a reliability map indicating reliability to the feature point at each block in an input image.

In one mode of the program, there is provided a program executed by a computer, the program causing the computer to function as: a first trainer configured to generate, on a basis of a training image and a training label which includes a correct coordinate value relating to a feature point included in the training image, a first discriminator learned to output a predicted coordinate value relating to the feature point from the input image; a candidate area determinator configured to determine, on a basis of a predicted coordinate value outputted by the first discriminator to which the training image is inputted, a candidate area of the feature point in the training image; and a second trainer configured to generate, on a basis of an image that is the candidate area cut out from the training image, a second discriminator learned to output a reliability map indicating reliability to the feature point at each block in an input image.

In one mode of the program, there is provided a program executed by a computer, the program causing the computer to function as: a first discriminator processor configured to acquire a predicted coordinate value relating to a feature point by inputting a target image to a first discriminator, the first discriminator being learned, on a basis of a training image and a training label, to output a predicted coordinate value relating to the feature point from the input image, the training label including a correct coordinate value relating to the feature point included in the training image; a candidate area determinator configured to determine a candidate area of the feature point in the target image based on the predicted coordinate value; and a second discriminator processor configured to output a reliability map corresponding to a cut-out image by inputting the cut-out image to a second discriminator, the cut-out image indicating the candidate area cut out from the target image, the second discriminator being learned to output a reliability map indicating reliability to the feature point at each block in an input image.

Effect of the Invention

An example advantage according to the present disclosure is to learn a discriminator for generating high-precision information relating to feature point(s) from a target image. Another example advantage according to the present disclosure is to generate highly accurate information relating to feature point(s) from a target image based on the learned discriminator.

BRIEF DESCRIPTION OF THE DRAWINGS

FIG. 6A illustrates a predicted position indicating a predicted coordinate value for the target feature point (here, the nose) in the target image in which the feature point is hidden. FIG. 6B illustrates a candidate area in the target image indicated by FIG. 6A. FIG. 6C illustrates a reliability map for the candidate area.

DESCRIPTION OF EXAMPLE EMBODIMENTS

Hereinafter, an example embodiment of a control method, a learning device, a discrimination device, and a program will be described with reference to the drawings.

[Overall Configuration]

Figure 1:
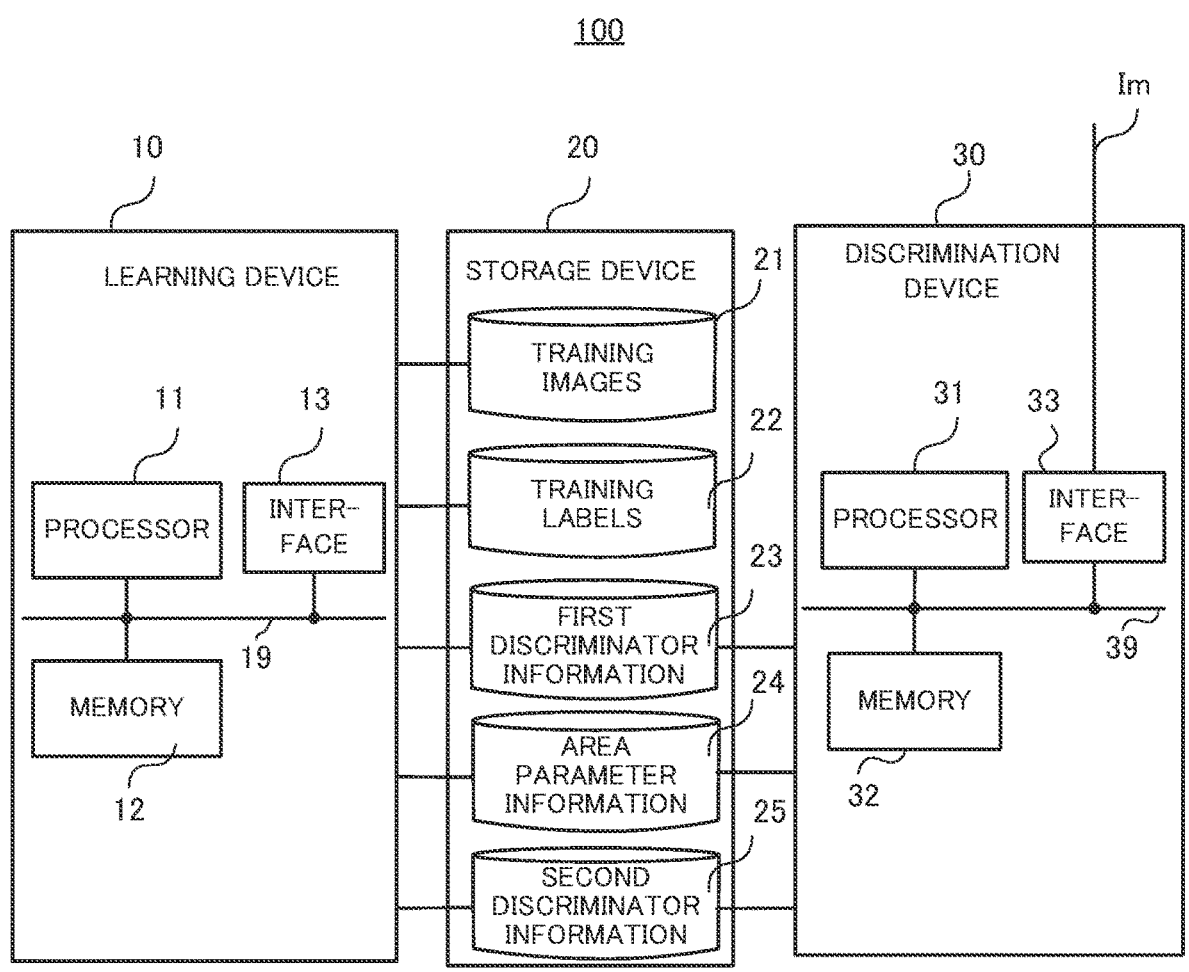
FIG. 1 illustrates a schematic configuration of an information processing system in the example embodiment.

FIG. 1 illustrates a schematic configuration of an information processing system 100 in the present example embodiment. The information processing system 100 performs processing related to extraction of a feature point in an image using two learning models (each also referred to as a "first learning model" and a "second learning model").

Here, the first learning model is an arithmetic model that outputs, when an image is inputted thereto as a sample, coordinate value(s) for determining an area (also referred to as a "candidate area AC") as a candidate for extracting a feature point in the image. Further, the second learning model is an arithmetic model that outputs, when an image that is the candidate area AC cut out from an image is inputted thereto as a sample, a reliability map for the feature point in the cut-out image of the candidate area AC. The first learning model and the second learning model may each be a learning model based on a neural network, and may be other types of learning models such as a support vector machine. In the present example embodiment, the learned (trained) first learning model functions as a first discriminator, and the learned (trained) second learning model functions as a second discriminator.

The information processing system 100 includes a learning device 10, a storage device 20 and a discrimination device 30.

The learning device 10 performs training of the first learning model and the second learning model based on training images 21 and training labels 22.

The storage device 20 is a device which the learning device 10 and the discrimination device 30 can refer to and writing data on, and stores the training images 21, the training labels 22, the first discriminator information 23, the area parameter information 24 and the second discriminator information 25. The storage device 20 may be an external storage device such as a hard disk connected to or built in to either the learning device 10 or the discrimination device 30, may be a storage medium such as a flash memory, or may be a server device that performs data communication with the learning device 10 and the discrimination device 30. For example, when the storage device 20 is a storage medium, the discrimination device 30 reads the information from the storage medium and executes the discrimination processing after the first discriminator information 23, the area parameter information 24 and the second discriminator information 25 generated by the learning device 10 are stored on the storage medium.

The training images 21 are a plurality of images used for training of the first learning model and the second learning model. Each training image 21 include feature point(s) to be extracted by the information processing system 100. For example, when the information processing system 100 is a system for extracting a plurality of backbone points of a person, each of the training images 21 includes a person image in which at least one of the backbone points is displayed. Thus, each training image 21 includes at least one feature point that the information processing system 100 should extract.

The training labels 22 include information indicating a correct answer (solution) of a coordinate value (also referred to as a "correct coordinate value") of feature point(s) included in each of the training images 21, and identification information representing the feature point. For example, when a nose that is a feature point is displayed in a certain training image 21, the training label 22 includes information indicating the correct coordinate value of the nose in the target training image 21 and information indicating a nose. The training label 22, which includes the identification information representing the feature point and the correct coordinate value of the feature point, functions as training data together with the training image 21, and are used for learning (training) of the first learning model and the second learning model. It is noted that the training label 22 may further include reliability map information regarding a feature point to be extracted. This reliability map is defined, for example, to form a normal distribution in a two-dimensional direction whose maximum value is the reliability at the correct coordinate value of each feature point. In this case, the reliability map functions as training data together with the training image 21 and is used for training of the second learning model as a correct reliability map of the second learning model.

The first discriminator information 23 includes various information necessary to configure the first discriminator. For example, the first discriminator information 23 includes parameter information obtained through the training of the first learning model by use of the training images 21 and the training labels 22 by the learning device 10 for each feature point to be extracted by the information processing system 100. For example, if the first learning model is a neural network, such as a convolutional neural network, the parameter information includes information such as the layer structure, the neuron structure of each layer, the number of filters and filter sizes in each layer, and the weights of each element of each filter. Hereafter, the coordinate value outputted from the first discriminator is referred to as "predicted coordinate value".

The area parameter information 24 is information relating to a parameter (also referred to as "area parameter") for defining (determining) the candidate area AC, and is generated by the learning device 10. For example, when the candidate area AC is determined as a rectangular area, the area parameter information 24 is information indicating the vertical width and horizontal width of the candidate area AC. The candidate area AC is not limited to a rectangular area. For example, when the candidate area AC is determined as a circle area, the area parameter information 24 is information indicating the radius or the diameter of the candidate area AC. When the candidate area AC is set as an elliptical area, the area parameter information 24 is information indicating the major axis and the minor axis of the candidate area AC. Hereafter, as an example, the candidate area AC will be described as being a rectangular area.

The second discriminator information 25 includes various information necessary to function the second discriminator. For example, the second discriminator information 25 includes parameter information obtained through the training of the second learning model by the learning device 10 for each type of feature point to be extracted by the information processing system 100. As will be described later, a cut-out image of the candidate area AC is used in the training of the second learning model, wherein the candidate area AC is set based on the predicted coordinate value of the feature point outputted by the first discriminator and the image of the candidate area AC is cut out from the training image 21.

The discrimination device 30 calculates the coordinate value of the feature point included in the target image Im inputted to the discrimination device 30 by using the first discriminator configured by referring to the first discriminator information 23 and the second discriminator configured by referring to the second discriminator information 25.

[Hardware Configuration]

FIG. 1 also illustrates the hardware configurations of the learning device 10 and the discrimination device 30. The description will be given of the hardware configurations of the learning device 10 and the discrimination device 30 with reference to FIG. 1.

The learning device 10 includes, as hardware, a processor 11, a memory 12, and an interface 13. The processor 11, the memory 12, and the interface 13 are connected to one another via a data bus 19.

The processor 11 executes a program stored on the memory 12 to execute processing relating to the training of the first learning model and the second learning model. The processor 11 is a processor such as a CPU (Central Processor) or a GPU (Graphics Processor).

The memory 12 includes various memories such as a RAM (Random Access Memory), a ROM (Read Only Memory), and a flash memory. The memory 12 stores a program for executing a process relating to the training (learning) executed by the learning device 10. The memory 12 is used as a work memory and temporarily stores information acquired from the storage device 20. The interface 13 is an interface for transmitting and receiving data to and from the storage device 20, and includes network adapters, USB, SATA (Serial AT Attachment), and the like. For example, if the learning device 10 is capable of communicating with the storage device 20 via a network, the interface 13 transmits a data write instruction to the storage device 20 and receives data stored on the storage device 20.

The discrimination device 30 includes, as hardware, a processor 31, a memory 32 and an interface 33.

The processor 31 executes a program stored on the memory 32, and executes extraction processing of predetermined feature point(s) for the target image Im. The processor 31 is a processor such as a CPU, a GPU, or the like.

The memory 32 includes various memories such as a RAM, a ROM, and a flash memory. The memory 32 stores a program for executing a process relating to the discrimination executed by the discrimination device 30. Further, the memory 32 is used as a work memory, temporarily stores information acquired from the first discriminator information 23 and the second discriminator information 25 or the like. The memory 32 temporarily stores the target image Im inputted to the interface 33.

The interface 33 is an interface for supplying the target image Im to the memory 32. For example, when the target image Im is supplied from an external device, the interface 33 functions as an interface for transmitting and receiving data to and from the storage device 20 or receiving the target image Im from an external device (not shown), and includes a network adapter, a USB, a SATA, and the like. The interface for connecting to the storage device 20 and the interface for receiving the target image Im may be different.

The hardware configurations of the learning device 10 and the discrimination device 30 are not limited to the configurations shown in FIG. 1. For example, the learning device 10 may further include an input unit for accepting a user input, an output unit such as a display or a speaker, and the like. Similarly, the discrimination device 30 may include an input unit for accepting user input, an output unit such as a display or a speaker, and a communication interface for transmitting the processing result executed by the processor 31 to an external device or performing data communication with the storage device 20.

[Learning Process]

Next, details of the learning (training) process executed by the learning device 10 will be described.

(1) Functional Configuration

Figure 2:
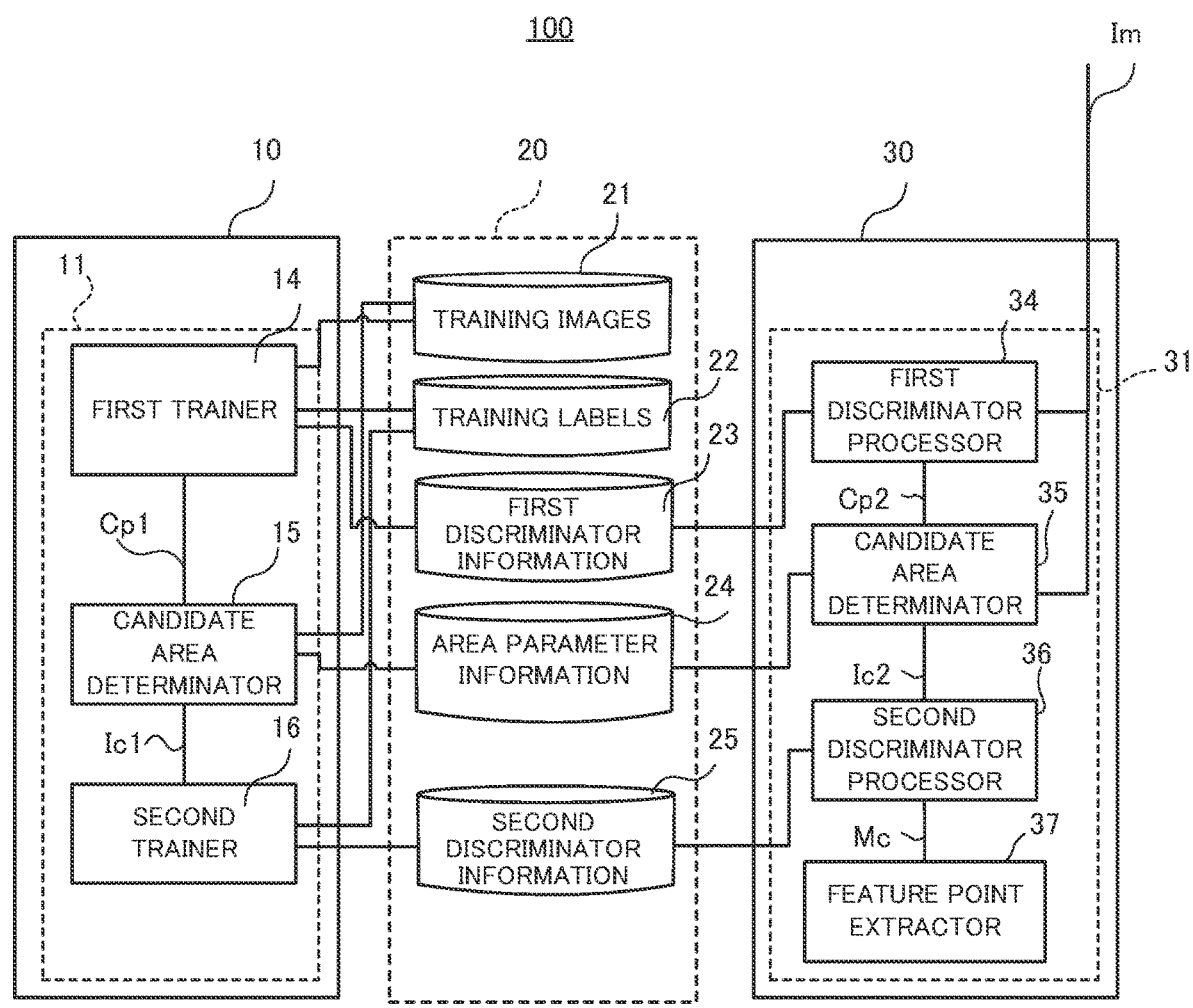
FIG. 2 is a functional block diagram of the information processing system.

FIG. 2 is a functional block diagram of the information processing system 100. As shown in FIG. 2, the processor 11 of the learning device 10 functionally includes a first trainer 14, a candidate area determinator 15 and a second trainer 16.

The first trainer 14 generates the first discriminator by training the first learning model based on the training images 21 and the training labels 22, and stores the first discriminator information 23 including parameters to configure the generated first discriminator on the storage device 20. Here, the first learning model is an arithmetic model that directly outputs, in response to the input of an input image, the coordinate value (i.e., the position in the input image) of the feature point(s) inferred to be included in the input image. The first learning model may be a complex learning model into which various learning models are integrated, and it may be any calculation model configured to directly output the coordinate value of the feature point.

Further, the first trainer 14 calculates the predicted coordinate values "Cp1" by inputting the training images 21 to the first discriminator. Then, the calculated predicted coordinate values Cp1 are supplied to the candidate area determinator 15.

The candidate area determinator 15 determines, on the basis of the predicted coordinate values Cp1 supplied from the first trainer 14, the candidate area AC in the training image 21 used by the first trainer 14. In the present example embodiment, as an example, the candidate area determinator 15 sets a rectangular area centered on each predicted coordinate value Cp1 as a candidate area AC. In the present example embodiment, on the basis of the dispersion (variation) in the difference between the predicted coordinate value Cp1 for the training image 21 and the corresponding correct coordinate value, the candidate area determinator 15 determines the horizontal width and the vertical width which are the area parameter for determining the size and shape of the candidate area AC. This specific example will be described later with reference to FIG. 3. Then, the candidate area determinator 15 supplies an image (also referred to as "cut-out image Ic1") obtained by cutting out the candidate area AC from the training image 21 to the second trainer 16.

Further, the candidate area determinator 15 stores information indicating the area parameter generated for each feature point to be extracted on the storage device 20 as the area parameter information 24.

The second trainer 16 generates the second discriminator by training the second learning model based on the cut-out image Ic1 supplied from the candidate area determinator 15, and stores the second discriminator information 25 including the parameter to configure the generated second discriminator on the storage device 20. Here, the second learning model is an arithmetic model that outputs, when an input image is inputted thereto, a reliability map indicating the reliability in each block in the input image with respect to the target feature point. The second learning model may be various learning models, and may be any calculation model configured to output a reliability map in the inputted image. It is noted that a block serving as a unit of outputted reliability is an area in the input image delimited based on a predetermined rule and that each block may be one corresponding to each pixel in the image or may correspond to N×N pixel group (N is a positive number) or may correspond to a sub-pixel that is a further delimited pixel.

Here, the process by the candidate area determinator 15 will be specifically described with reference to FIGS. 3A to 3D.

Figure 3A:
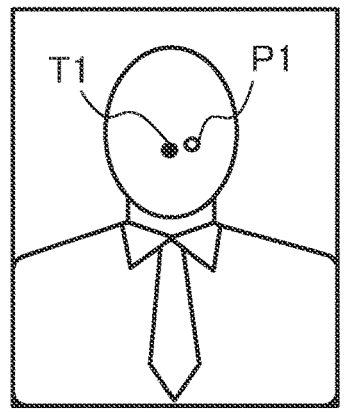
FIGS. 3A to 3C illustrates, in the case of extracting the coordinate value of the nose as a feature point, the correct position corresponding to the predicted position and the correct coordinate value corresponding to the predicted coordinate value in the training images inputted to the first discriminator.
Figure 3B:
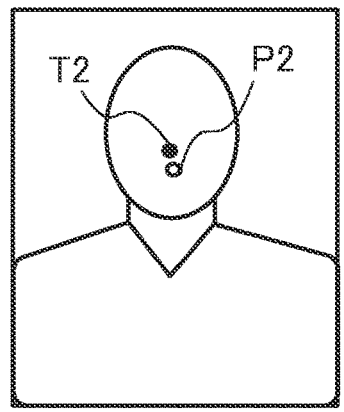
Figure 3C:
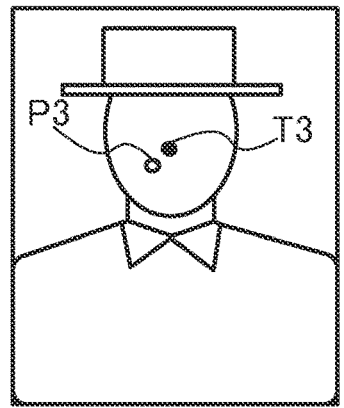
Figure 3D:
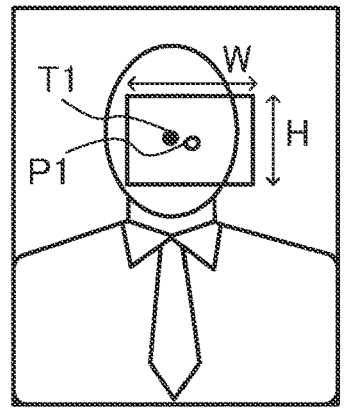
FIG. 3D illustrates the set candidate area in the training image shown in FIG. 3A.

FIGS. 3A to 3C illustrates training images 21 each inputted to the first discriminator together with the predicted positions P1 to P3 corresponding to the predicted coordinate values Cp1 and the correct position positions T1 to T3 corresponding to the correct coordinate values, when the coordinate values of the nose are extracted as the feature point. In the examples of FIGS. 3A to 3C, when each training image 21 in which the nose is displayed is inputted to the first discriminator, a predicted coordinate value Cp1 (corresponding to the predicted positions P1 to P3) is outputted, wherein the predicted coordinate value Cp1 indicates a position which deviates in both of the horizontal direction and the vertical direction from the correct coordinate value (corresponding to the correct positions T1 to T3) of the nose indicated by the training label 22. FIG. 3D illustrates a training image 21 shown in FIG. 3A together with the determined candidate area AC.

In this case, the candidate area determinator 15 determines the candidate area AC that is a rectangular area shown in FIG. 3D based on the dispersion in the difference between the correct coordinate value and the predicted coordinate value Cp1 for each of the training images 21 in which the feature point of the nose is displayed. Specifically, first, the candidate area determinator 15 calculates, for each of the training images 21 in which the feature point of the nose is displayed, the difference between the correct coordinate value and the predicted coordinate value Cp1 (for example, the relative coordinate value of the predicted coordinate value Cp1 with respect to the correct coordinate value). Then, for example, the candidate area determinator 15 determines the vertical width "H" and the horizontal width "W" of the candidate area AC, so that the predetermined ratio or more of the predicted coordinate values Cp1 for the training images 21 is included in the candidate area AC provided that the correct coordinate value is set as the center of the candidate area AC. In another example, the candidate area determinator 15 may consider that the dispersion in the difference between the correct coordinate value and the predicted coordinate value Cp1 follows the normal distribution, and set a predetermined confidence interval (for example, 95% to 99% confidence interval) with respect to the vertical direction as the vertical width H, and set a predetermined confidence interval with respect to the horizontal direction as the horizontal width W.

In the example of FIG. 3D, the candidate area determinator 15 determines, with respect to the training image 21 shown in FIG. 3A, the candidate area AC centered on the predicted position P1. Further, the candidate area determinator 15 also determines the candidate areas AC to the training images 21 illustrated in FIGS. 3B and 3C. The candidate area determinator 15 supplies the cut-out images Ic1 corresponding to the candidate areas AC determined in the training images 21 to the second trainer 16.

(2) Process Flow

Figure 4:
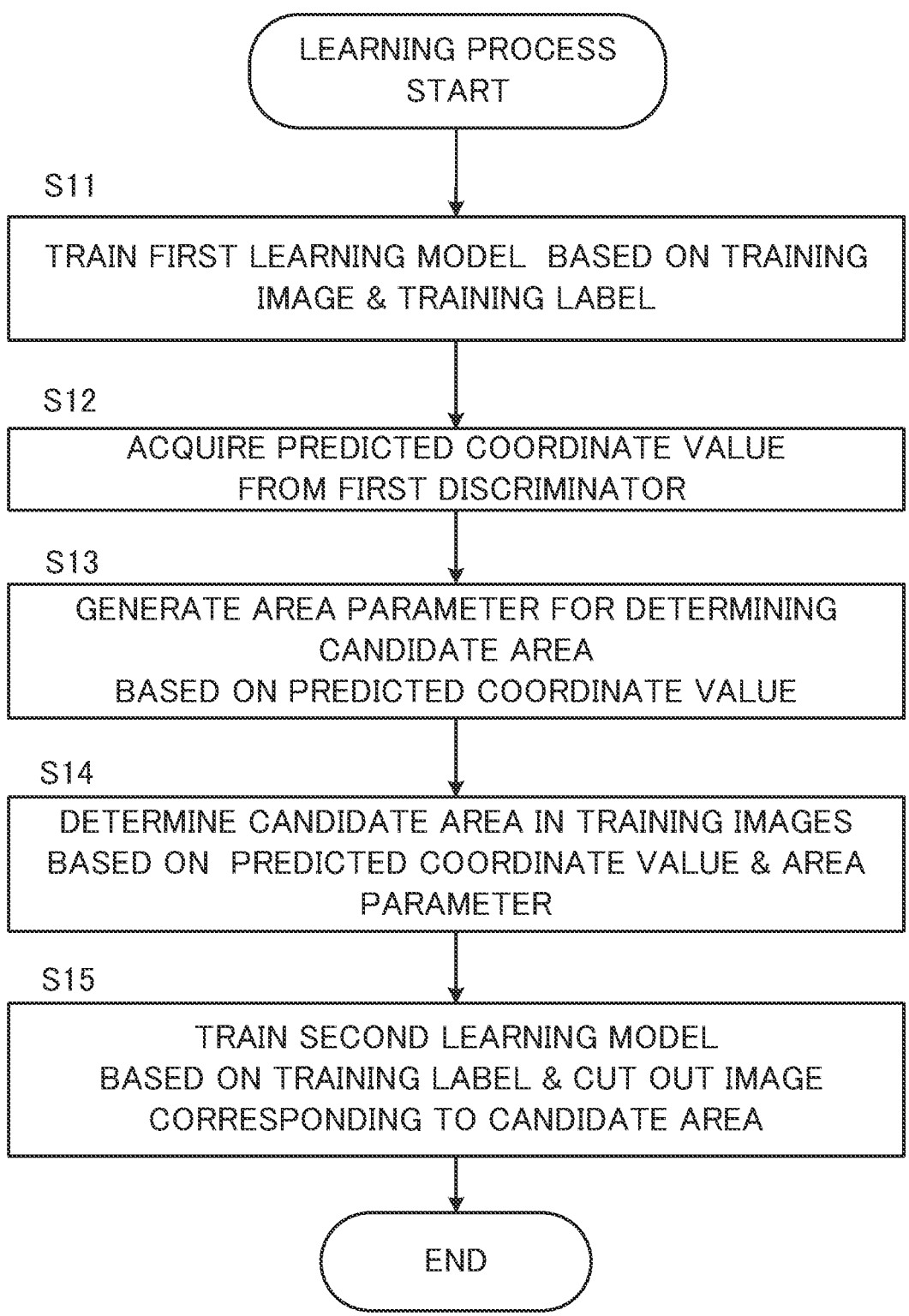
FIG. 4 is a flowchart indicative of the procedure of the learning process.

FIG. 4 is a flowchart illustrating a procedure of a learning process executed by the learning device 10. The learning device 10 executes processing of the flowchart shown in FIG. 4 for each type of feature point to be extracted by the information processing system 100.

First, the first trainer 14 of the learning device 10 performs the training of the first learning model based on the training images 21 and the correct coordinate values of the feature point indicated by the training labels 22 (step S11). Then, the first trainer 14 stores the parameters of the first learning model obtained by the training at step S11 as the first discriminator information 23. Further, the first trainer 14 acquires, from the first discriminator that is the trained first learning model, the predicted coordinate value Cp1 for each of the training images 21 in which the target feature point is displayed (step S12).

Next, the candidate area determinator 15 of the learning device 10 generates the area parameter for determining the candidate area based on the dispersion in the difference between the predicted coordinate values Cp1 calculated at step S12 and the correct coordinate values indicated by the training labels 22 corresponding thereto (Step S13). Then, the candidate area determinator 15 determines the candidate area AC for each of the training images 21 used at step S11 on the basis of the predicted coordinate values Cp1 calculated at step S12 and the area parameter generated at step S13 (Step S14). The candidate area determinator 15 stores the area parameter information 24 indicating the area parameter generated at step S13 on the storage device 20.

The second trainer 16 of the learning device 10 performs the training of the second learning model based on the cut-out images Ic1, which is obtained by cutting out each candidate area AC from each of the training images 21, and the correct coordinate values of the target feature points (step S14). Then, the second trainer 16 stores the parameter of the second learning model obtained by the training at step S14 as the second discriminator information 25 on the storage device 20.

(3) Effect

Next, an effect based on the functional configuration of the learning device 10 shown in FIG. 2 will be described.

In general, when a learning model that directly outputs the coordinate value (that is, the position in the image) of the feature point in the input image is used like the first learning model, there is an advantage that both of the processing load required for the learning thereof and the processing load required for discrimination processing after the learning become low. On the other hand, a discriminator learned according to such a learning model has an issue that the position accuracy of the coordinate value of the feature point to be outputted is relatively low, and also has another issue that it always outputs the coordinate value of the feature point even when the feature point of the object is hidden.

Further, like the second learning model, a learning model that outputs the reliability map for the input image is used, there is an advantage that the positional accuracy of the feature point specified based on the reliability map is increased, and when the feature point of the object is hidden, the extraction of the feature point can be prevented through the threshold processing of the reliability, or the like. On the other hand, such a learning model calculates the reliability of each block (for example, for each pixel) in the image for each feature point, which leads to an issue that the processing load required for the learning processing and the discrimination processing after the learning is increased.

In view of the above, according to the present example embodiment, the learning device 10 determines the candidate area AC based on the predicted coordinate value Cp1 outputted by the first discriminator that is the first learning model after the learning, and performs the training of the second learning model by using the cut-out images Id corresponding to the candidate areas AC. Thereby, the learning device 10 can reduce the processing load required for the training of the second learning model by appropriately limiting the image area to be used for the second learning model while training, at a low processing load, the first learning model configured to output the predicted coordinate value for determining the position of the candidate area AC. Further, as will be described later, by using the first discriminator and the second discriminator learned by the learning device 10, the discrimination device 30 can extract the coordinate value of the feature point from the target image Im with a high degree of accuracy while suitably suppressing outputting the coordinate value of a target feature point by mistake when the target feature point is hidden.

[Discrimination Process]

Next, a detailed description will be given of the discrimination processing performed by the discrimination device 30.

(1) Functional Block

The functional configuration of the discrimination device 30 will be described again with reference to the functional block diagram of FIG. 2. As shown in FIG. 2, the processor 31 of the discrimination device 30 functionally includes a first discriminator processor 34, a candidate area determinator 35, a second discriminator processor 36 and a feature point extractor 37.

The first discriminator processor 34, when a target image Im is inputted to the discrimination device 30, on the basis of the first discriminator configured by referring to the first discriminator information 23, executes the processing for the target image Im. Specifically, by inputting the target image Im to the first discriminator, the first discriminator processor 34 calculates the predicted coordinate value "Cp2" for the feature point to be extracted by the information processing system 100. Then, the first discriminator processor 34 supplies the calculated predicted coordinate value Cp2 to the candidate area determinator 35.

By referring to the area parameter information 24, the candidate area determinator 35 determines the candidate area AC for the target image Im from the predicted coordinate value Cp2 supplied from the first discriminator processor 34. For example, when the area parameter information 24 indicates the information indicative of the vertical width H and the horizontal width W of the candidate area AC, the candidate area determinator 35 determines the candidate area AC whose center is the predicted coordinate value Cp2 and which has the vertical width H and the horizontal width W in the target image Im. Then, the candidate area determinator 35 supplies the second discriminator processor 36 with the cut-out image "Ic2" obtained by cutting out the set candidate area AC from the target image Im.

The second discriminator processor 36 executes, on the basis of the second discriminator configured by referring to the second discriminator information 25, a process for the cut-out image Ic2. Specifically, by inputting the cut-out image Ic2 to the second discriminator, the second discriminator processor 36 generates a reliability map "Mc", wherein the reliability map Mc indicates the reliability for the target feature point for each block of the cut-out image Ic2. Then, the second discriminator processor 36 supplies the generated reliability map Mc to the feature point extractor 37.

The feature point extractor 37 computes the coordinate value of the target feature point in the target image Im based on the reliability map Mc supplied from the second discriminator processor 36. The feature point extractor 37 may store the information indicative of the calculated coordinate value of the feature point on the storage device 20, may transmit the information to another device that communicates with the discrimination device 30, or may supply the information to another processor in the discrimination device 30 that performs predetermined processing based on the feature point.

Here, a description will be given of the first extraction example to the third extraction example, which are specific examples of the extraction method of the coordinate value of the feature point executed by the feature point extractor 37.

According to the first extraction example, when the reliability corresponding to the coordinate value at which the reliability becomes the maximum in the reliability map Mc is equal to or higher than a predetermined threshold value, the feature point extractor 37 extracts the coordinate value at which the reliability becomes the maximum as the coordinate value of the feature point. In this case, the above-described threshold value is determined to be, for example, a lower limit value of the reliability that can be considered that the target feature point is displayed in the image, and is a value predetermined based on learning or experimental trials. When the reliability corresponding to the coordinate value at which the reliability becomes the maximum in the reliability map Mc is less than the predetermined threshold value, the feature point extractor 37 determines that there is no feature point. In this way, the feature point extractor 37 performs the threshold determination on the reliability with respect to the position where the possibility of being the feature point is the highest. Thereby, it is possible to suitably prevent extracting the coordinate value of the feature point by mistake when the feature point is hidden in the target image Im.

It is noted that the feature point extractor 37 may calculate a continuous function (regression curve) approximating the reliability map Mc, which is discrete data of reliability, based on the known analysis processing, and specify the coordinate value of the feature point based on the value of the obtained continuous function. In this case, the feature point extractor 37 generates the reliability in each sub-block (for example, in units of sub-pixels) delimited in detail than the block of the reliability map Mc by the calculated continuous function. Then, the feature point extractor 37 computes the coordinate value of the position of the sub-block whose reliability is the maximum and equal to or larger than the threshold value as the coordinate value of the feature point. Thereby, the feature point extractor 37 performs interpolation for the reliability map Mc which is discrete data, and can calculate the coordinate value of the feature point with a high degree of accuracy.

According to the second extraction example, the feature point extractor 37 computes the center of gravity position (that is, the coordinate value of the center of gravity) of the reliability map Mc. Then, in a case where the reliability with respect to the center of gravity position is equal to or larger than the threshold value, the feature point extractor 37 regards the coordinate value of the center of gravity position as the coordinate value of the feature point. In this case, when calculating the coordinate value of the above-described center of gravity position, the feature point extractor 37 regards the reliability at each block of the reliability map Mc as the weight of each block. The feature point extractor 37 may specify the coordinate value of the center of gravity position in units of sub-pixels. In addition, similarly to the first extraction example, the feature point extractor 37 may calculate a continuous function approximating to the reliability map Mc and calculate the coordinate value of the center of gravity position based on the value of the continuous function in the cut-out image Ic2. Even according to the second extraction example, the feature point extractor 37 can calculate the coordinate value of the feature point with a high degree of accuracy while preventing extracting the coordinate value of the hidden feature point by mistake.

According to the third extraction example, the feature point extractor 37 specifies local maximum value(s) of the reliability in the reliability map Mc and determines whether or not the specified local maximum value(s) are equal to or larger than a predetermined threshold value, respectively. Then, the feature point extractor 37 extracts the coordinate value(s) of local peak position(s) corresponding to local maximum value(s) that are equal to or larger than the threshold value as the coordinate value(s) of the feature point. Even in the third extraction example, as with the first extraction example, the feature point extractor 37 may calculate a continuous function approximating the reliability map Mc thereby to specify the coordinate value of the local peak position as the coordinate value of the feature point in units of sub-pixels. According to the third extraction example, in addition to the same effects as the first extraction example and the second extraction example, the feature point extraction unit 37 can suitably extract the coordinate values of the feature point even when there are a plurality of the target feature point in the candidate area AC.

(2) Specific Example

Next, a specific example of processing by the discrimination device 30 will be described with reference to FIGS. 5A to 5C and FIGS. 6A to 6C.

Figure 5A:
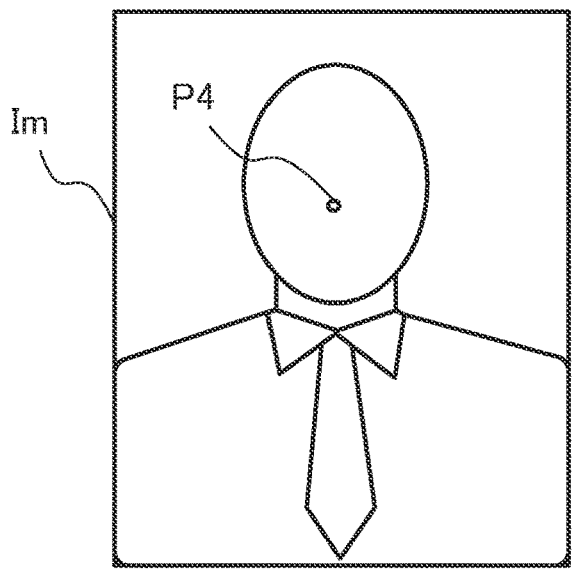
FIG. 5A illustrates a predicted position indicating a predicted coordinate value for the feature point of the object (here, the nose) in the target image in which the feature point appears.
Figure 5B:
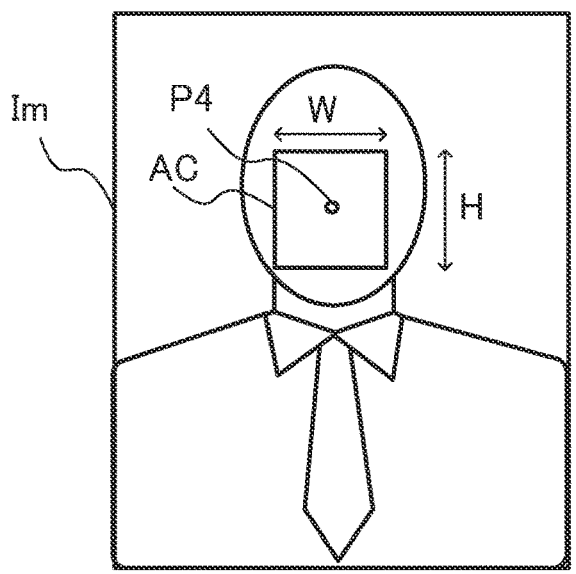
FIG. 5B illustrates a candidate area in the target image in FIG. 5A.
Figure 5C:
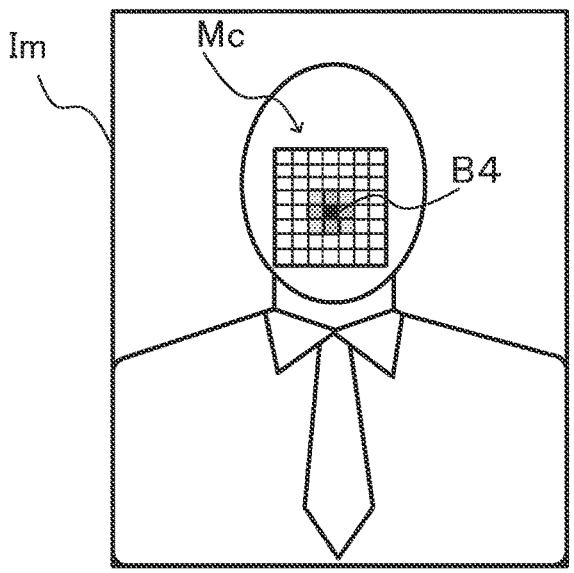
FIG. 5C illustrates a reliability map for the candidate area.

FIG. 5A illustrates the target image Im, which is inputted to the first discriminator processor 34, with the clearly-shown predicted position P4 indicating the predicted coordinate value Cp2 calculated by the first discriminator processor 34 with respect to the target feature point (here, nose). FIG. 5B illustrates a candidate area AC, which the candidate area determinator 35 determines, on the target image Im illustrated in FIG. 5A. FIG. 5C illustrates a reliability map Mc which the second discriminator processor 36 calculates from the cut-out image Ic2 corresponding to the candidate area AC. For convenience, FIG. 5C displays the candidate area AC so that the color of the candidate area AC becomes dark with increasing reliability in the candidate area AC.

In this case, the first discriminator processor 34 supplies the predicted coordinate value Cp2 corresponding to the predicted position P4 shown in FIG. 5A to the candidate area determinator 35. Then, on the basis of the vertical width H and the horizontal width W indicated by the area parameter information 24, the candidate area determinator 35 determines the candidate area AC whose center position is the predicted position P4 as shown in FIG. 5B. Then, by inputting the cut-out image Ic2 obtained by cutting out the candidate area AC to the second discriminator, the second discriminator processor 36 calculates a reliability map Mc indicating the reliability of each block (e.g., for each pixel) in the cut-out image Ic2. Then, on the basis of the reliability map Mc, the feature point extractor 37 determines that the reliability of the block B4 that is the fifth block from the top and fourth block B4 from the left in the cut-out image Ic2 is the highest and is equal to or higher than a predetermined threshold value. Therefore, the feature point extractor 37 acquires the coordinate value corresponding to the block B4 in the target image Im as the coordinate value of the feature point.

FIG. 6A illustrates the target image Im, which is inputted to the first discriminator processor 34, with the clearly-shown predicted position P5 indicating the predicted coordinate value Cp2 calculated by the first discriminator processor 34 with respect to the target feature point (here, nose). FIG. 6B illustrates a candidate area AC, which the candidate area determinator 35 determines, over the target image Im shown in FIG. 6A. FIG. 6C illustrates a reliability map Mc which the second discriminator processor 36 calculates from the cut-out image Ic2 corresponding to the candidate area AC. It is noted that, in the example of FIGS. 6A to 6C, the target feature point (here, the nose) does not appear on the target image Im due to the existence of a display placed in front of the target person. Further, for convenience, FIG. 6C displays the cut-out image Ic2 so that the color thereof becomes dark with increasing reliability.

In this case, the first discriminator processor 34 supplies the predicted coordinate value Cp2 corresponding to the predicted position P4 shown in FIG. 6A to the candidate area determinator 35. Then, the candidate area determinator 35 determines, on the basis of the area parameter information 24, as shown in FIG. 6B, the candidate area AC whose center position is the predicted position P4. Then, by inputting the cut-out image Ic2 obtained by cutting out the candidate area AC to the second discriminator, the second discriminator processor 36 calculates a reliability map Mc indicating the reliability of each block (e.g., for each pixel) in the cut-out image Ic2.

Here, in the reliability map Mc shown in FIG. 6C which the second discriminator processor 36 calculates, the reliability in each block of the cut-out image Ic2 is lower than the threshold value. Therefore, in this case, the feature point extractor 37 determines that the target feature point do not exist in the cut-out image Ic2 and the feature point extractor 37 does not perform the feature point extracting.

(3) Process Flow

Figure 7:
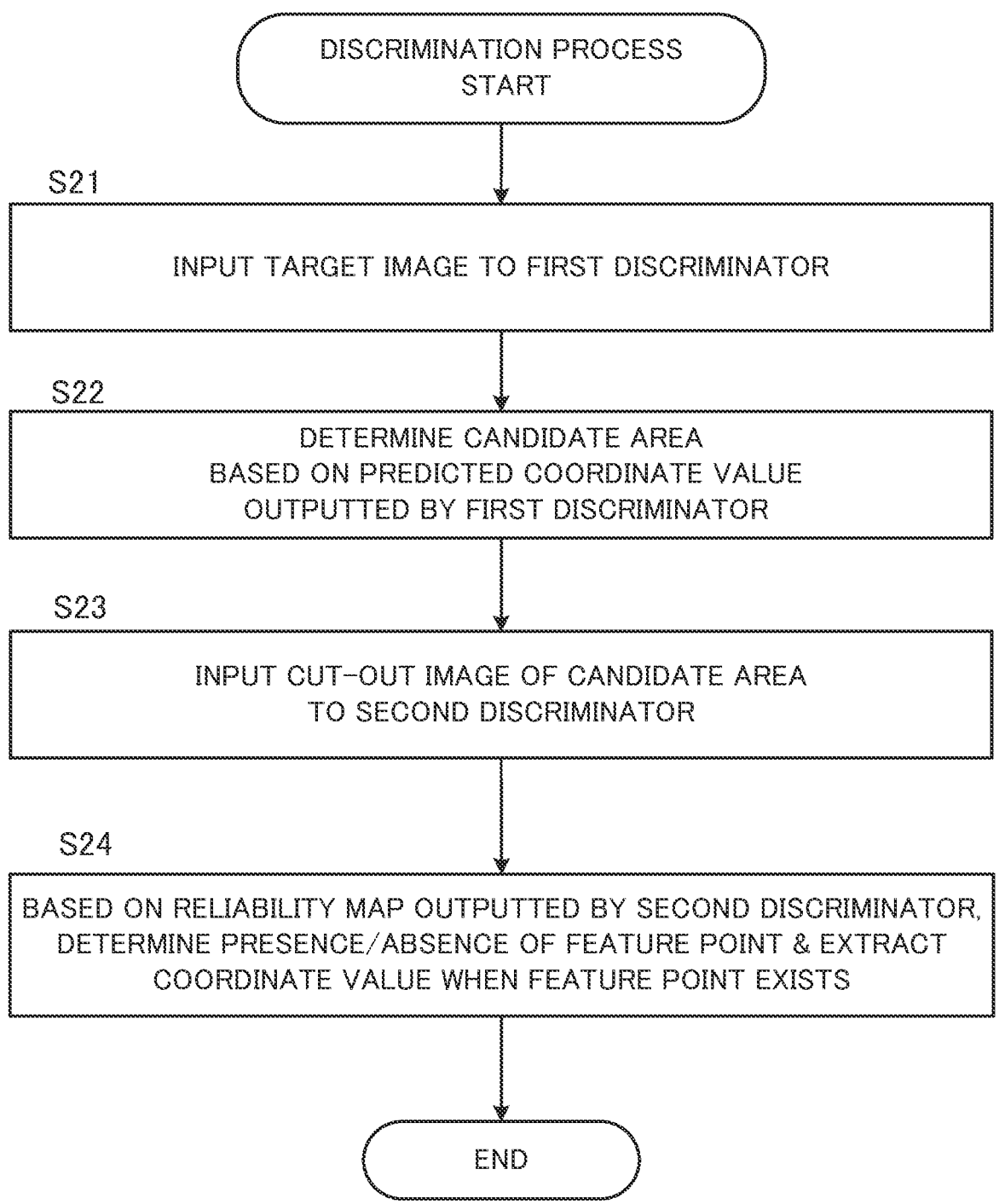
FIG. 7 is a flowchart indicative of the procedure of the discrimination process.

FIG. 7 is a flowchart showing the procedure of the discrimination process performed by the discrimination device 30. The discrimination device 30 executes, in a case where the target image Im is inputted thereto, the processing of the flowchart shown in FIG. 7 for each type of feature point to be detected.

First, the discrimination device 30 performs a process of inputting the input target image Im to the first discriminator (step S21). In this case, the discrimination device 30 configures a first discriminator by referring to the first discriminator information 23. Then, the discrimination device 30 inputs the target image Im to the first discriminator of the above to obtain a predicted coordinate value Cp2.

Next, the discrimination device 30 determines the candidate area AC for the target image Im based on the predicted coordinate value Cp2 outputted from the first discriminator (step S22). Specifically, the discrimination device 30 determines the candidate area AC in the target image Im based on the area parameter indicated by the area parameter information 24 and the predicted coordinate value Cp2.

Then, the discrimination device 30 inputs the cut-out image Ic2 obtained by cutting out the candidate area AC from the target image Im to the second discriminator (step S23). In this case, the discrimination device 30 configures a second discriminator by referring to the second discriminator information 25. Then, the discrimination device 30 inputs the cut-out image Ic2 to the second discriminator to obtain a reliability map Mc indicating the reliability in each block of the cut-out image Ic2. Then, on the basis of the reliability map Mc outputted by the second discriminator, the discrimination device 30 makes a determination of the presence or absence of the target feature point and performs, when the target feature point exists, the extraction of the coordinate value of the feature point (Step S24). In this way, the discrimination device 30 can output the coordinate value of the feature point only when the target feature point is present on the target image Im while it does not output the coordinate value of the feature point when the target feature point is hidden.

(4) Effect

Next, an effect based on the functional configuration of the discrimination device 30 shown in FIG. 2.

As described above, when the feature point extraction is performed by use of only the first learning model that directly outputs the coordinate value of the feature point with respect to the input image, there is an issue that, even though the processing load becomes light, the positional accuracy of the feature point extraction becomes relatively low. Besides, there is another issue that the coordinate value is outputted even when the feature point is hidden.

On the other hand, when the feature point extraction is performed by use of only the second learning model that outputs the reliability map for the input image, the positional accuracy of the feature point specified based on the reliability map becomes high, and when the target feature point is hidden, the extraction of the feature point can be prevented by the threshold processing of the reliability. On the other hand, in such a learning model, the reliability of each block in the input image is calculated for each type of the feature point, and the processing load required for the learning processing and the discrimination processing after the learning is increased.

In consideration of the above, in the present example embodiment, the discrimination device 30 sets the candidate area AC to the target image Im at a low processing cost using the first discriminator that is the first learning model after the learning, and inputs the cut-out image Ic2 corresponding to the candidate area AC to the second discriminator that is the second learning model after the learning. Thus, the discrimination device 30 can obtain a reliability map Mc for specifying the coordinate value for the target feature point with a high degree of accuracy while suppressing an increase in processing load by suitably reducing the image size to be inputted to the second discriminator. Further, when there is an occluded (hidden) feature point, the discrimination device 30 can suitably suppress outputting the coordinate value of the feature point by mistake.

Next, an application example of the discrimination processing by the discrimination device 30 will be described with reference to FIGS. 8 to 10.

Figure 8:
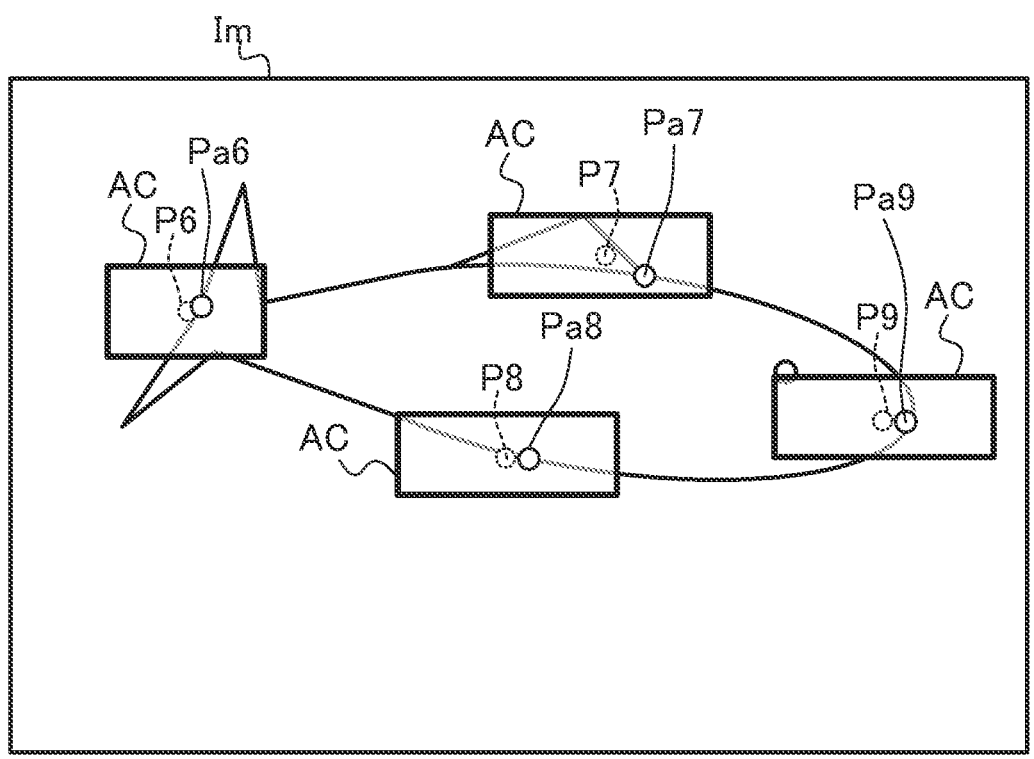
FIG. 8 illustrates a processing result by the discrimination device for each feature point on the target image of a fish.

FIG. 8 is a diagram showing a processing result by the discrimination device 30 for each feature point in the target image Im of a fish. FIG. 8 illustrates: the predicted positions P6 to P9 corresponding to the predicted coordinate values Cp2 calculated by the first discriminator processor 34; the candidate areas AC; and the extraction positions Pa6 to Pa9 corresponding to the coordinate values of the respective feature points extracted by the feature point extractor 37.

In this example, the learning device 10 executes the learning process for extracting the respective feature points at the tail fin, back fin, belly and head of the fish based on the flowchart indicated by FIG. 4, and the discrimination device 30 calculates the coordinate values of the respective feature points corresponding to the extracted positions Pa6 to Pa9 by using the reliability map Mc based on the flowchart indicated by FIG. 7. Specifically, the discrimination device 30 calculates the predicted coordinate values Cp2 (corresponding to the predicted positions P6 to P9) for each of the feature points (the tail fin, the back fin, the belly, and the head) to be extracted by inputting the target image Im to the first discriminator, and determines the candidate area AC for each of these predicted coordinate values Cp2. Then, the discrimination device 30 calculates the reliability map Mc2 for each target feature point by inputting the cut-out image Ic2 corresponding to the candidate area AC to the second discriminator, and calculates the coordinate values (corresponding to the extracted position Pa6 to Pa9) of the respective feature points based on the reliability map Mc.

As shown in FIG. 8, the extracted positions Pa6 to Pa9 indicate more accurate feature point positions than the predicted positions P6 to P9. For example, the discrimination device 30 can suitably perform the automatic measurement of the fish displayed on the target image Im by using the coordinate values indicating the extraction positions Pa6 to Pa9 of the feature points accurately computed in this way.

Figure 9:
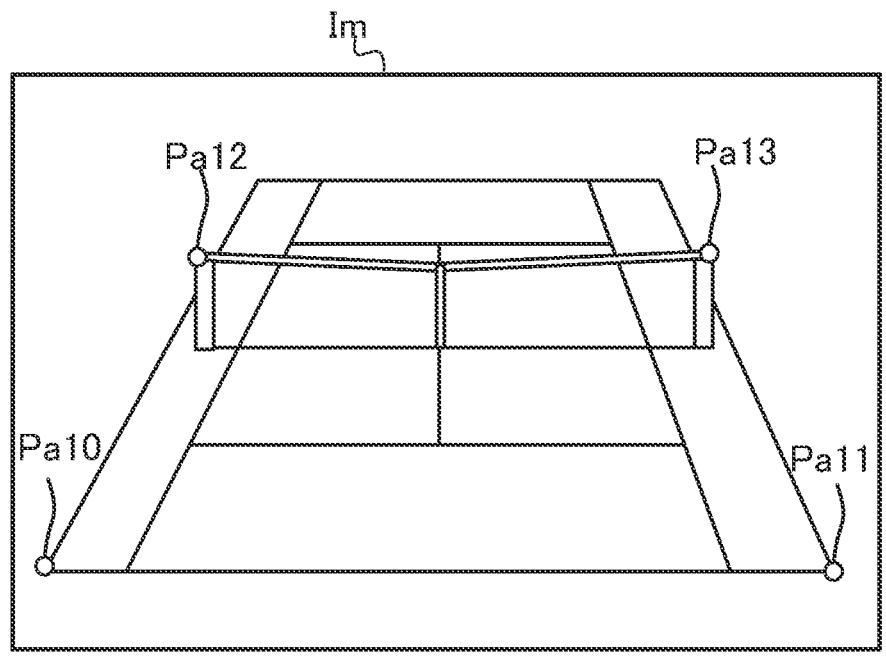
FIG. 9 illustrates the extraction positions corresponding to the coordinate values extracted by the discrimination device on the target image of a tennis coat.

FIG. 9 illustrates the extracted positions Pa10 to Pa13 corresponding to the coordinate values extracted by the discrimination device 30 from the target image Im of a tennis coat.

In this example, the learning device 10 executes learning process for extracting each feature point of the left corner, the right corner, the vertex of the left pole, and the vertex of the right pole of the front side coat of the tennis coat based on the flowchart indicated by FIG. 4. Then, the discrimination device 30 accurately calculates the coordinate values (corresponding to the extracted positions Pa10 to Pa13) of the respective feature points by using the reliability map Mc based on the flowchart of FIG. 7.

By extracting feature points using images taken during such sports watching as target images Im, it is possible to suitably perform calibration of AR (Augmented Reality) in sports watching. For example, in such a case that an image by the AR is superimposed on the real world using a head-mounted display or the like incorporating the discrimination device 30, on the basis of the target image Im to be captured from the vicinity of the viewpoint of the user by the head-mounted display, the discrimination device 30 calculates the coordinate values of predetermined feature points as references in the target sport. This makes it possible for the head-mounted display to accurately perform the calibration of the AR and to display images accurately associated with the real world.

Figure 10:
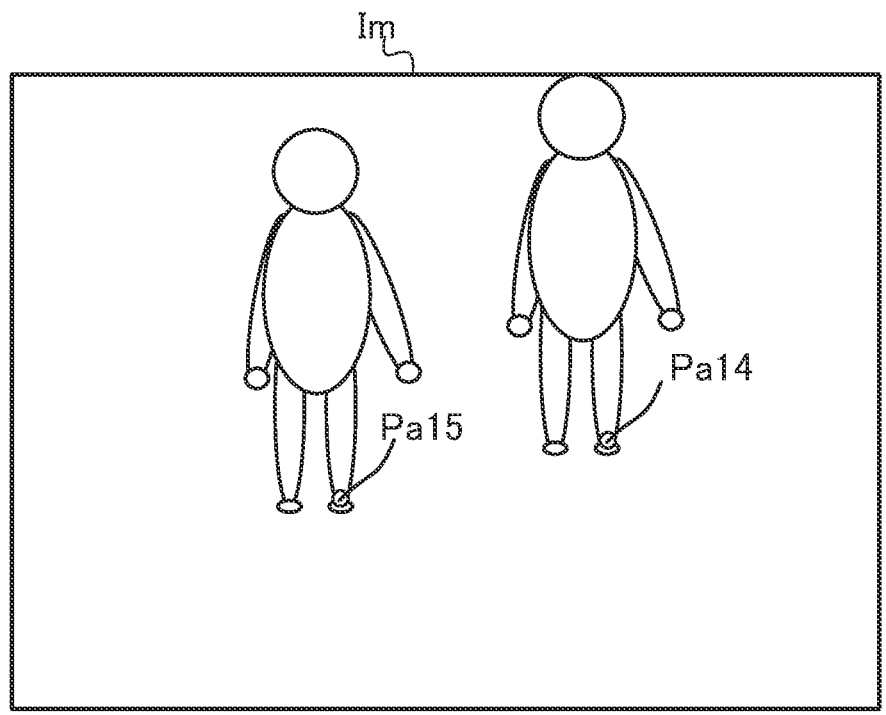
FIG. 10 illustrates the extraction positions corresponding to the coordinate values extracted by the discrimination device on the target image of a person.

FIG. 10 illustrates the extracted positions Pa14 and Pa15 corresponding to the coordinate values extracted by the discriminating device 30 from the target image Im of a person.

In this example, the learning device 10 executes the learning process for extracting the human ankle (here, the left ankle) as a feature point based on the flowchart of FIG. 4, and the discrimination device 30 calculates the coordinate values (corresponding to the extracted positions Pa14 and Pa15) of the respective feature points based on the reliability map Mc according to the flowchart of FIG. 7.

In the example of FIG. 10, since there are a plurality of persons, for example, the discrimination device 30 may divide the input target image Im into a plurality of areas and regards each of the plurality of areas as the target image Im to perform the flowchart indicated by FIG. 7, respectively. In this case, the discrimination device 30 may divide the inputted target image Im by a predetermined size, or may divide the inputted target image Im for each person detected through any of known person detection algorithms.

It is also possible to apply it to the security field by regarding the image of human(s) as the target image and carrying out feature point extraction. For example, the discrimination device 30 can accurately capture the position of a person by using the accurately-extracted coordinate value of the ankle (corresponding to the extracted positions Pa14 and Pa15), and can suitably perform, for example, detection of an approach of a person to a predetermined area.

MODIFICATION

Next, a description will be given of preferred modifications to the example embodiment described above. The modifications described below may be applied to the example embodiments described above in arbitrary combination.

First Modification

At step S13 in FIG. 4, the learning device 10 generates the area parameters for determining the candidate area AC based on the dispersion in the difference between the predicted coordinate value Cp1 calculated by the first discriminator and the correct coordinate value indicated by the corresponding training label 22. However, the method of determining the candidate area AC is not limited thereto. In the following, other determination methods of the candidate area AC (second to fourth determination methods) will be specifically described.

As a second determination method of the candidate area AC, the learning device 10 may generate the area parameter information 24 by learning the area parameter such that the accuracy of the reliability map Mc outputted by the second discriminator becomes maximum. Specifically, on the basis of the accuracy of the reliability map Mc for each of parameters (also referred to as "candidate parameter"), which are candidates for the area parameter, the learning device 10 may select the area parameter from candidate parameters.

Figure 11A:
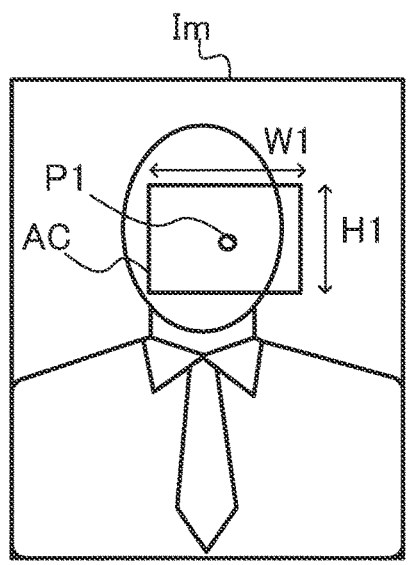
FIGS. 11A to 11C indicate candidate areas set by applying three different candidate parameters to the training image shown in FIG. 3A.
Figure 11B:
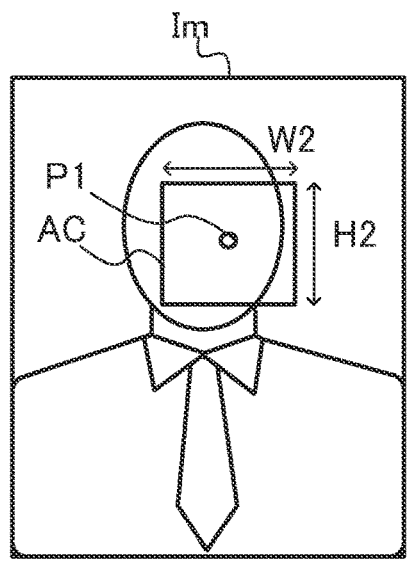
Figure 11C:
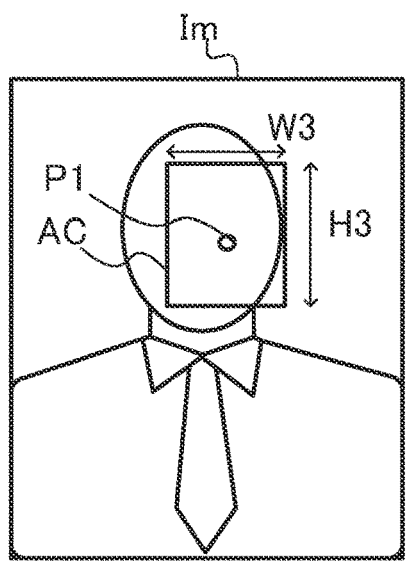

In this case, for example, the learning device 10 applies a plurality of candidate parameters to the predicted coordinate value Cp1 outputted by the first discriminator, thereby determining multiple patterns of the candidate areas AC in the training image 21. FIGS. 11A to 11C are diagrams illustrating a candidate areas AC determined by applying three different candidate parameters to the training image 21 shown in FIG. 3A. In the example of FIG. 11A, the horizontal width W1 and the vertical width H1 are used as the first candidate parameter. In the example of FIG. 11B, the horizontal width W2 and the vertical width H2 are used as the second candidate parameter. In the example of FIG. 11C, the width W3 and the vertical width H3 are used as the third candidate parameter.

The learning device 10 performs the learning process of the second learning model based on the plurality of determined patterns of the candidate areas AC in this manner. Then, the learning device 10 compares the coordinate value of the feature point specified on the basis of the reliability map Mc outputted by the learned second learning model (that is, the second discriminator) with the correct coordinate value indicated by the training label 22, and calculates the accuracy of the reliability map Mc with respect to each candidate parameter. For example, in this case, the learning device 10 considers that the smaller the dispersion (for example, the variance value) of the difference between the coordinate value of the feature point specified on the basis of the reliability map Mc and the correct coordinate value indicated by the training label 22 is, the higher the accuracy of the reliability map Mc becomes. Then, the learning device 10 determines the candidate parameter with the highest accuracy as the area parameter. In this case, the learning device 10 may use the candidate parameter with the highest accuracy as a reference and newly set candidate parameter(s) that indicate the neighborhood value of the reference candidate parameter. In this case, the learning device 10 may search for more suitable area parameters by calculating the accuracy of the reliability map Mc obtained when each newly set candidate parameter is applied, and comparing the accuracy with that of the reliability map Mc obtained when the reference candidate parameter is applied.

As a third determination method of the candidate area AC, the learning device 10 may use, as the first learning model, a learning model configured to output a plurality of coordinate values for determining the candidate area.

In this case, for example, the first learning model is an arithmetic model that outputs the coordinate values of the vertices of the diagonal positions of the candidate area AC that is a rectangular area, and the learning device 10 trains the first learning model based on the training image 21 and the training label 22. In this case, the correct coordinate value indicating the vertices of the diagonal positions of the candidate area AC to be set in the corresponding training image 21 is recorded in the training label 22. In this case, preferably, the coordinate values of the vertices of the diagonal positions of the candidate area AC recorded in the training label 22 are predetermined so that the candidate area AC does not include any object other than the object or its part (e.g., the entire face in the case of a nose) to which the target feature point belongs. Thus, it is possible to learn the first learning model for outputting the coordinate values of the vertices of the diagonal positions pointing to the candidate area AC suitable for extracting the feature point.

Figure 12A:
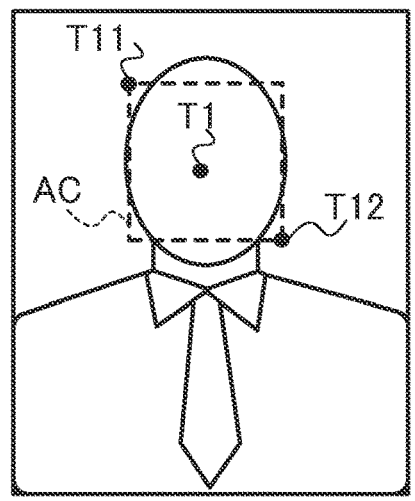
FIGS. 12A to 12C illustrates correct positions recorded on the training labels as correct coordinate values according to a first modification on the training image shown in FIG. 3A.

FIG. 12A is illustrates, on the training image 21 illustrated in FIG. 3A, the correct positions T11 and T12 corresponding to the correct coordinate values indicated by the training label 22 according to the present modification. In this example, the coordinate values of the upper left corner and the lower right corner of the candidate area AC to be set are recorded on the training label 22 as the correct coordinate values. Then, the candidate area AC specified by the correct answer positions T11 and T12 is determined so as not to include any object other than the face including the nose which is a feature point of the object.

It is noted that the first learning model in this case is not limited to the calculation model that outputs the coordinate values of the vertices of the diagonal positions. For example, when the candidate area AC is a circle area, the first learning model may be an arithmetic model that outputs the coordinate values of the two intersections at which a straight line passing through the center of the candidate area AC to be set intersects with the boundary of the candidate area AC.

Figure 12B:
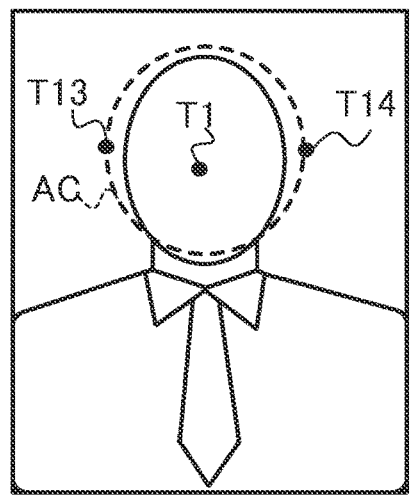
Figure 12C:
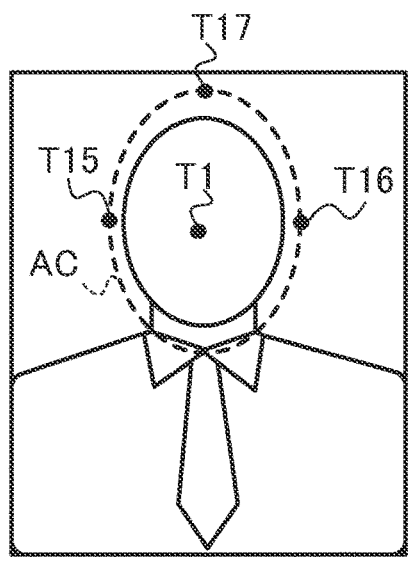

FIG. 12B illustrates, on the training image 21, correct positions T13 and T14 indicated by the correct coordinate values when the candidate area AC is a circle area. In this example, the candidate area AC specified by the correct answer positions T13 and T14 is suitably set so that any object other than the face including the nose which is the target feature point are not included. FIG. 12C illustrates, on the training image 21, correct positions T15 to T17 indicated by the correct coordinate values in the case where the candidate area AC is the elliptical area. In this example, the candidate area AC is identified based on the three correct coordinate values. In this example, the candidate area AC specified by the correct positions T15-T17 is also suitably set up so that any object other than the face containing the nose which is the target feature point are not included.

In this way, the first learning model may be any calculation model configured to output a plurality of coordinate values necessary for specifying the shape of the candidate area AC.

Figure 13:
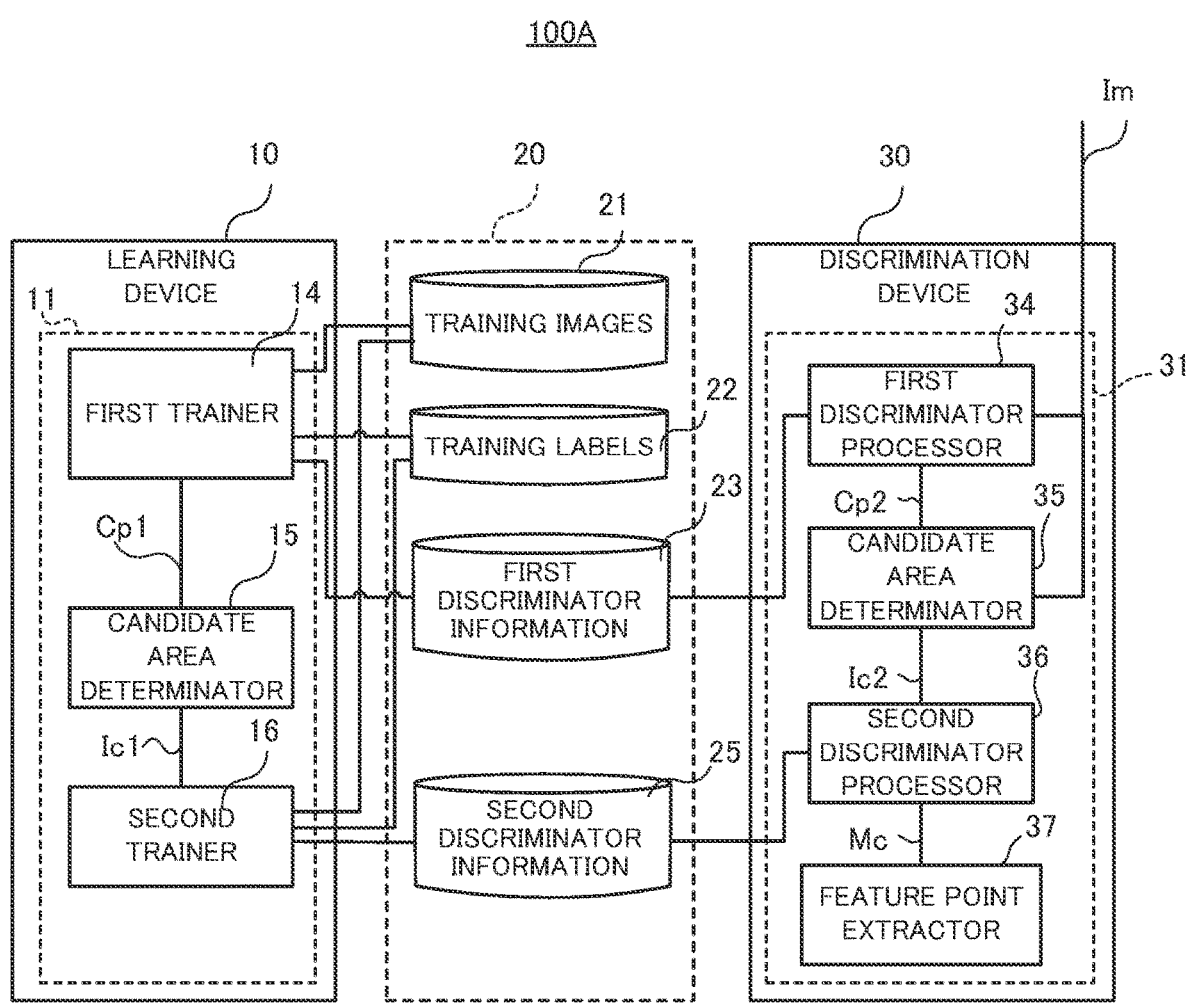
FIG. 13 is a block diagram of an information processing system according to the first modification.

FIG. 13 is a block diagram of an information processing system 100A when executing a third determination method of the candidate area AC. As shown in FIG. 13, in the third determination method of the candidate area AC, the information processing system 100A does not have the area parameter information 24. The training labels 22 also includes information of a plurality of correct coordinate values for specifying the candidate area AC. Then, the candidate area determinator 15 determines the candidate area AC for the training image 21 based on a plurality of predicted coordinate values Cp1 supplied from the first trainer 14. In the same way, the candidate area determinator 35 determines the candidate area AC for the target image Im based on a plurality of predicted coordinate values Cp2 supplied from the first discriminator processor 34.

As a fourth determination method of the candidate area AC, the learning device 10 generates the first discriminator by training the learning model (i.e., the learning model that outputs a plurality of coordinate values for determining the candidate area AC) used in the third determination method so that the learning model outputs the coordinate values of the rectangular candidate area AC to maximize the accuracy of the reliability map Mc.

Specifically, the learning device 10 stores in advance a set of candidate parameters that become candidates for the area parameter for determining the candidate area AC as follows:

$$\{(y\_min1, x\_min1, y\_max1, x\_max1), (y\_min2, x\_min2, y\_max2, x\_max2), \ldots\}.$$

Here, for example, the learning device 10 stores, as the candidate parameter, a set of coordinates (for example, a set of coordinates of the positions T11 and T12 shown in FIG. 12A) indicating, among the vertices of the rectangular area, a vertex at which the x coordinate and the y coordinate become the minimum, and a vertex at which the x coordinate and the y coordinate become the maximum, respectively. Then, the learning device 10 acquires the reliability map Mc for each candidate parameter by inputting the cut-out image Id obtained by cutting out the candidate area AC based on each candidate parameter to the second discriminator. Then, the learning device 10 adopts a candidate parameter in which the accuracy of the acquired reliability map Mc becomes maximum as the correct data (that is, the training label 22) to be outputted by the first learning model.

The learning device 10 performs the above-mentioned process for each of the training images 21 and determines a candidate parameter suitable for each of the training images 21 and feature points, and performs the learning (training) of the first learner. Then, the learning device 10 stores the discriminator information relating to the first discriminator obtained by learning the first learning model in this manner on the first discriminator information 23. By constructing such a first discriminator, the learning device 10 can generate the first discriminator configured to predict the candidate area AC that maximizes the accuracy of the reliability map Mc for each input target image Im and each feature point.

Second Modification

The configuration of the information processing system 100 shown in FIG. 1 is an example and the configuration to which the present invention can be applied is not limited thereto.

For example, the learning device 10 and the discrimination device 30 may be configured by the same device. In another example, the information processing system 100 may not have a storage device 20. In this case, the learning device 10 generates the first discriminator information 23, the area parameter information 24, and the second discriminator information 25 and transmits them to the discrimination device 30. Then, the discrimination device 30 stores the received first discriminator information 23, area parameter information 24, and second discriminator information 25 on the memory 32 or on an external storage device so as to be able to refer to.

Third Modification

The discrimination device 30 may not have a function corresponding to the feature point extractor 37.

Figure 14:
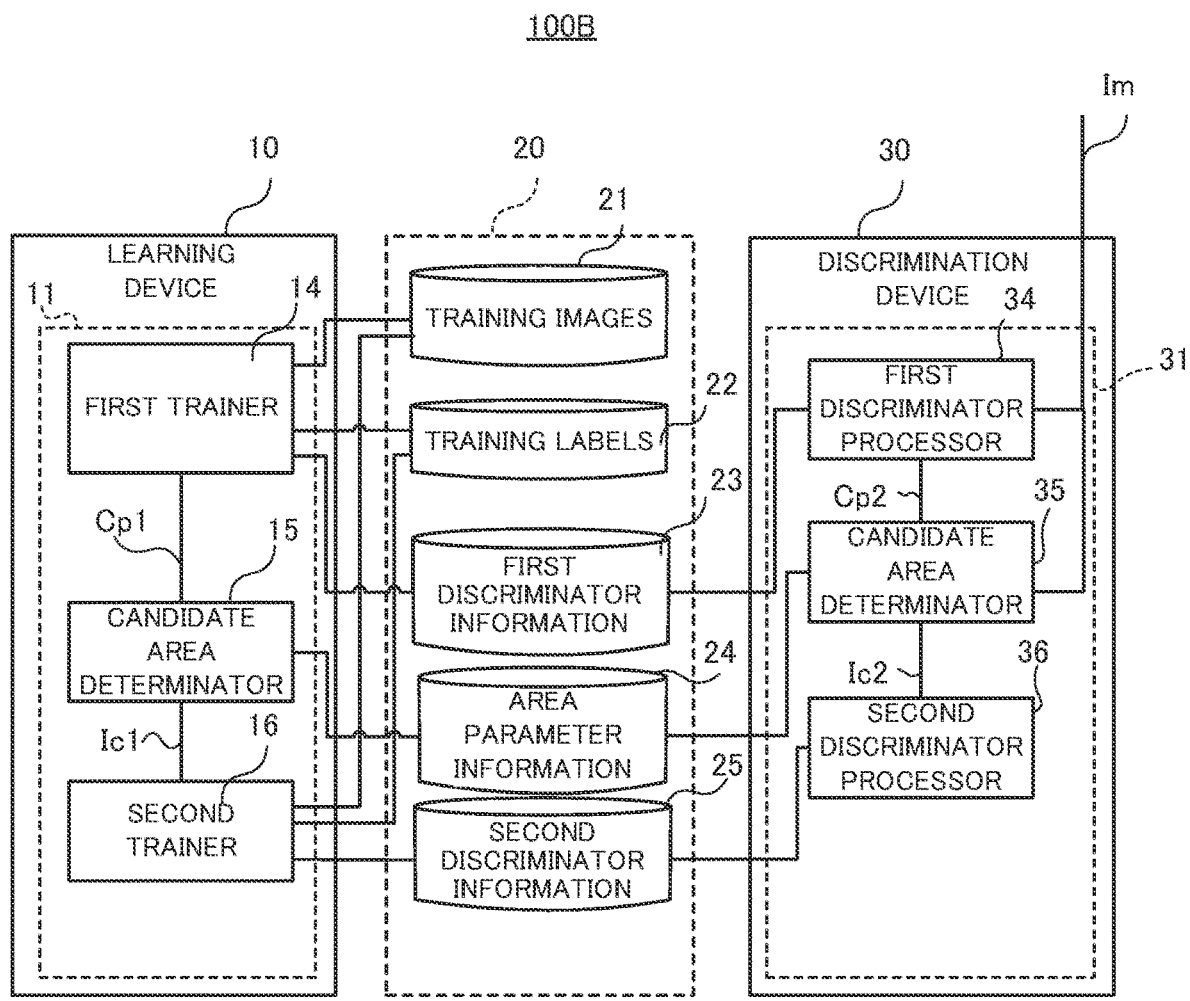
FIG. 14 is a block diagram of an information processing system according to a third modification.

FIG. 14 is a functional block diagram of an information processing system 100B according to the third modification. In the configuration example according to FIG. 14, for example, the discrimination device 30 stores the reliability map Mc on the storage device 20 instead of performing the feature extraction process after the second discriminator processor 36 generates the reliability map Mc. In this case, for example, an external device (not shown) executes processing corresponding to the feature point extractor 37 by referring to the reliability map Mc stored on the storage device 20. Instead of storing the reliability map Mc in the storage device 20, the discrimination device 30 may transmit the reliability map Mc to the external device described above. In another example, the discrimination device 30 or the external device described above may perform predetermined processing using the reliability map Mc as an input.

The whole or a part of the example embodiments described above (including modifications, the same applies hereinafter) can be described as, but not limited to, the following Supplementary Notes.

[Supplementary Note 1]

A control method executed by an information processing system, comprising:
  generating, on a basis of a training image and a training label which includes a correct coordinate value relating to a feature point included in the training image, a first discriminator learned to output a predicted coordinate value relating to the feature point from an input image;
  determining, on a basis of a predicted coordinate value outputted by the first discriminator to which the training image is inputted, a candidate area of the feature point in the training image;
  generating, on a basis of an image that is the candidate area cut out from the training image, a second discriminator learned to output a reliability map indicating reliability to the feature point at each block in an input image;
  acquiring a predicted coordinate value relating to the feature point by inputting a target image to the first discriminator;
  determining the candidate area of the feature point in the target image based on the predicted coordinate value; and
  outputting the reliability map corresponding to a cut-out image by inputting the cut-out image to the second discriminator, the cut-put image indicating the candidate area cut out from the target image.

[Supplementary Note 2]

A learning device comprising:
  a first trainer configured to generate, on a basis of a training image and a training label which includes a correct coordinate value relating to a feature point included in the training image, a first discriminator learned to output a predicted coordinate value relating to the feature point from the input image;
  a candidate area determinator configured to determine, on a basis of a predicted coordinate value outputted by the first discriminator to which the training image is inputted, a candidate area of the feature point in the training image; and
  a second trainer configured to generate, on a basis of an image that is the candidate area cut out from the training image, a second discriminator learned to output a reliability map indicating reliability to the feature point at each block in an input image.

[Supplementary Note 3]

The learning device according to Supplementary Note 2, wherein the candidate area determinator calculates a difference between the predicted coordinate value and a correct coordinate value corresponding to the predicted coordinate value for a plurality of the training images, and wherein the candidate area determinator determines the candidate area from the predicted coordinate value based on a dispersion of the calculated difference.

[Supplementary Note 4]

The learning device according to Supplementary Note 2, wherein the correct coordinate value relating to the feature point is a plurality of correct coordinate values specifying the candidate area for the feature point,
  wherein the first trainer generates, on a basis of the training image and the plurality of the correct coordinate values, the first discriminator configured to output a plurality of the predicted coordinate values specifying the candidate area from the input image, and
  wherein the candidate area determinator determines the candidate area from the plurality of the predicted coordinate values.

[Supplementary Note 5]

The learning device according to Supplementary Note 4, wherein the first trainer selects, from multiple candidates of the plurality of correct coordinate values, a candidate for which an accuracy of the reliability map for the candidate area indicated by each of the candidates is the maximum, and generates, on a basis of the selected candidate and the training image, the first discriminator configured to output the plurality of the predicted coordinate values specifying the candidate area from the input image.

[Supplementary Note 6]

The learning device according to Supplementary Note 2, wherein, in a case of generating a parameter for determining the candidate area from the predicted coordinate values, the candidate area determinator selects, on a basis of an accuracy of the reliability map for each of a plurality of candidates of the parameter, a candidate to be used as the parameter from the candidates.

[Supplementary Note 7]

A discrimination device comprising:

a first discriminator processor configured to acquire a predicted coordinate value relating to a feature point by inputting a target image to a first discriminator, the first discriminator being learned, on a basis of a training image and a training label, to output a predicted coordinate value relating to the feature point from the input image, the training label including a correct coordinate value relating to the feature point included in the training image;

a candidate area determinator configured to determine a candidate area of the feature point in the target image based on the predicted coordinate value; and a second discriminator processor configured to output a reliability map corresponding to a cut-out image by inputting the cut-out image to a second discriminator, the cut-out image indicating the candidate area cut out from the target image, the second discriminator being learned to output a reliability map indicating reliability to the feature point at each block in an input image.

[Supplementary Note 8]

The discrimination device according to Supplementary Note 7, further comprising a feature point extractor configured to:

calculate a coordinate value that is a candidate of the feature point based on the reliability map; and determine, in a case where the reliability corresponding to the coordinate value is equal to or higher than a predetermined threshold value, the coordinate value as a coordinate value of the feature point.

[Supplementary Note 9]

The discrimination device according to Supplementary Note 8, wherein the feature point extractor determines a center of gravity position of the reliability map as the coordinate value of the feature point.

[Supplementary Note 10]

The discrimination device according to Supplementary Note 8, wherein the feature point extractor determines a coordinate value serving as a local maximum point of the reliability as a coordinate value of the feature point.

[Supplementary Note 11]

The discrimination device according to any one of Supplementary Notes 8 to 10, wherein the feature point extractor determines a coordinate value of the feature point based on a function approximating the reliability map.

[Supplementary Note 12]

The discrimination device according to any one of Supplementary Notes 7 to 11, wherein the candidate area determinator determines the candidate area based on an area parameter read from a storage device that stores the area parameter and the predicted coordinate value outputted by the first discriminator, the area parameter being used to determine the candidate area from the predicted coordinate value.

[Supplementary Note 13]

A control method executed by a learning device, comprising:

generating, on a basis of a training image and a training label which includes a correct coordinate value relating to a feature point included in the training image, a first discriminator learned to output a predicted coordinate value relating to the feature point from an input image;

determining, on a basis of a predicted coordinate value outputted by the first discriminator to which the training image is inputted, a candidate area of the feature point in the training image; and generating, on a basis of an image that is the candidate area cut out from the training image, a second discriminator learned to output a reliability map indicating reliability to the feature point at each block in an input image.

[Supplementary Note 14]

A control method executed by a discrimination device, comprising:

acquiring a predicted coordinate value relating to a feature point by inputting a target image to a first discriminator, the first discriminator being learned, on a basis of a training image and a training label, to output a predicted coordinate value relating to the feature point from the input image, the training label including a correct coordinate value relating to the feature point included in the training image;

determining a candidate area of the feature point in the target image based on the predicted coordinate value; and outputting a reliability map corresponding to a cut-out image by inputting the cut-out image to a second discriminator, the cut-out image indicating the candidate area cut out from the target image, the second discriminator being learned to output a reliability map indicating reliability to the feature point at each block in an input image.

[Supplementary Note 15]

A program executed by a computer, the program causing the computer to function as:

a first trainer configured to generate, on a basis of a training image and a training label which includes a correct coordinate value relating to a feature point included in the training image, a first discriminator learned to output a predicted coordinate value relating to the feature point from the input image;

a candidate area determinator configured to determine, on a basis of a predicted coordinate value outputted by the first discriminator to which the training image is inputted, a candidate area of the feature point in the training image; and a second trainer configured to generate, on a basis of an image that is the candidate area cut out from the training image, a second discriminator learned to output a reliability map indicating reliability to the feature point at each block in an input image.

[Supplementary Note 16]

A program executed by a computer, the program causing the computer to function as:

a first discriminator processor configured to acquire a predicted coordinate value relating to a feature point by inputting a target image to a first discriminator, the first discriminator being learned, on a basis of a training image and a training label, to output a predicted coordinate value relating to the feature point from the input image, the training label including a correct coordinate value relating to the feature point included in the training image;

a candidate area determinator configured to determine a candidate area of the feature point in the target image based on the predicted coordinate value; and a second discriminator processor configured to output a reliability map corresponding to a cut-out image by inputting the cut-out image to a second discriminator, the cut-out image indicating the candidate area cut out from the target image, the second discriminator being learned to output a reliability map indicating reliability to the feature point at each block in an input image.

While the invention has been particularly shown and described with reference to example embodiments thereof, the invention is not limited to these embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent Literatures mentioned in this specification are incorporated by reference in its entirety.

DESCRIPTION OF REFERENCE NUMERALS

10 Learning device
11, 31 Processor
12, 32 Memory
20 Storage device
21 Training images
22 Training labels
23 First discriminator information
24 Area parameter information
25 Second discriminator information
30 Discrimination device
13,33 Interface
100, 100A, 100B information processing system

What is claimed is:

1. A learning device comprising:
a processor; and
a memory storing instructions executable by the processor to:
train, on a basis of a first training image of an object and a training label including a correct coordinate value relating to a feature point of the object, a first discriminator configured to output, from a first input image, a predicted coordinate value relating to a feature point in the first input image;
input the first training image to the trained first discriminator and receive as output from the first discriminator a predicted coordinate value relating to the feature point in the first training image;
determine, on a basis of the predicted coordinate value output by the first discriminator from the first training image, a candidate area of the feature point in the first training image;
generate a second training image by cropping the first training image to the candidate area as centered on the predicted coordinate value; and
train, on a basis of the second training image, a second discriminator configured to output, from a second input image, a reliability map indicating a reliability of a feature point at each of a plurality of blocks in the second input image,
wherein the processor selects, from multiple candidates of a plurality of the correct coordinate values, a candidate for which an accuracy of the reliability map for the candidate area is highest, and trains, on a basis of the selected candidate and the training image, the first discriminator,
wherein the processor trains, on a basis of the training image and the plurality of the correct coordinate values, the first discriminator configured to output a plurality of the predicted coordinate values, and
wherein the processor determines the candidate area from the plurality of the predicted coordinate values.

2. The learning device according to claim 1,
wherein the processor calculates a difference between the predicted coordinate value and the correct for each of the plurality of the training images, and
wherein the processor determines the candidate area from the predicted coordinate value based on a dispersion of the calculated difference.

3. A discrimination device comprising:
a processor; and
a memory storing instructions executable by the processor to:
input a first training image of an object to a first discriminator and receive as output from the first discriminator a predicted coordinate value relating to a feature point of the object in the first training image, the first discriminator trained on a basis of the first training image and a training label including a correct coordinate valuing relating to the feature point, the first discriminator configured to output, from a first input image, a predicted coordinate value relating to a feature point in the first input image;
determine, on a basis of the predicted coordinate value output by the first discriminator from the first training image, a candidate area of the feature point in the first training image;
generate a second training image by cropping the first training image to the candidate area as centered on the predicted coordinate value; and
input the second training image to a second discriminator and receive as output from the second discriminator a reliability map indicating a reliability of the feature point at each of a plurality of blocks in the second training image, the second discriminator trained and configured to output, from a second input image, a reliability map indicating a reliability of a feature point at each of a plurality of blocks in the second input image,
wherein the processor determines the candidate area based on an area parameter read from a storage device that stores the area parameter and the predicted coordinate value output by the first discriminator, the area parameter used to determine the candidate area from the predicted coordinate value.

4. The discrimination device according to claim 3,
wherein the processor calculates a coordinate value that is a candidate of the feature point based on the reliability map, and determines, when the reliability corresponding to the coordinate value is equal to or higher than a predetermined threshold value, the coordinate value as a coordinate value of the feature point.

5. The discrimination device according to claim 4, wherein the processor determines a center of gravity position of the reliability map as the coordinate value of the feature point.

6. The discrimination device according to claim 4, wherein the processor determines a coordinate value corresponding to as a local maximum point of the reliability as the coordinate value of the feature point.

7. The discrimination device according to any one of claim 4, wherein the processor determines the coordinate value of the feature point based on a function approximating the reliability map.

\* \* \* \* \*